United States Patent
Chen et al.

(10) Patent No.: US 12,158,644 B2
(45) Date of Patent: Dec. 3, 2024

(54) ELECTRONIC DEVICE

(71) Applicant: Innolux Corporation, Miaoli County (TW)

(72) Inventors: Hao-Yu Chen, Miaoli County (TW); Hong-Sheng Hsieh, Miaoli County (TW); Hsin-Chih Wu, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/336,051

(22) Filed: Jun. 16, 2023

(65) Prior Publication Data

US 2024/0036368 A1  Feb. 1, 2024

(30) Foreign Application Priority Data

Jul. 27, 2022  (CN) .......................... 202210890057.8

(51) Int. Cl.
*G02F 1/13* (2006.01)
*G02F 1/13357* (2006.01)

(52) U.S. Cl.
CPC ...... *G02F 1/1323* (2013.01); *G02F 1/133603* (2013.01)

(58) Field of Classification Search
CPC .................................................. G02F 1/1323
See application file for complete search history.

(56) References Cited

U.S. PATENT DOCUMENTS

| | | | |
|---|---|---|---|
| 2007/0176887 A1* | 8/2007 | Uehara | G02F 1/1323 345/102 |
| 2008/0002103 A1* | 1/2008 | Lee | H05B 45/385 349/68 |
| 2010/0053136 A1* | 3/2010 | Ohta | G09G 3/3413 345/87 |
| 2010/0253891 A1* | 10/2010 | Fujioka | G02F 1/133555 349/113 |
| 2020/0257155 A1* | 8/2020 | Wang | H10K 59/50 |
| 2021/0063783 A1* | 3/2021 | Byoun | G09G 3/3696 |

FOREIGN PATENT DOCUMENTS

| | | |
|---|---|---|
| CN | 110582806 | 12/2019 |
| TW | 201827894 | 8/2018 |

* cited by examiner

*Primary Examiner* — Alexander P Gross
(74) *Attorney, Agent, or Firm* — JCIPRNET

(57) ABSTRACT

An electronic device, including a display module, a viewing angle switchable panel, a switching element, and a driving element, is provided. The display module has multiple first units and multiple second units. The first units have a first color, and the second units have a second color. The first color and the second color are different. The switching element is used to switch the viewing angle switchable panel between a first viewing angle mode and a second viewing angle mode. The driving element is used to provide a first data voltage to at least one of the first units of the display module in the first viewing angle mode, and provide a second data voltage to the at least one of the first units in the second viewing angle mode. The first data voltage and the second data voltage are different.

11 Claims, 6 Drawing Sheets

ELECTRONIC DEVICE

CROSS-REFERENCE TO RELATED APPLICATION

This application claims the priority benefit of China application serial no. 202210890057.8, filed on Jul. 27, 2022. The entirety of the above-mentioned patent application is hereby incorporated by reference herein and made a part of this specification.

BACKGROUND

Technical Field

The disclosure relates to an electronic device, and in particular to an electronic device having a viewing angle switchable panel.

Description of Related Art

In recent years, as the concept of privacy has been paid more and more attention, there are designs of related privacy protection sheets in the display of electronic products such as automotive products, notebook computers, and mobile phones. However, in the case where the privacy protection sheet provides the privacy protection function, since a color shift may occur after the display light of the display passes through the privacy protection sheet, the display quality of the display may be affected.

SUMMARY

The disclosure provides an electronic device having a viewing angle switchable panel, which can provide a good privacy protection effect and display quality at the same time.

According to an embodiment of the disclosure, the electronic device of the disclosure includes a display module, a viewing angle switchable panel, a switching element, and a driving element. The display module has multiple first units and multiple second units. The first units have a first color. The second units have a second color. The first color and the second color are different. The switching element is coupled to the viewing angle switchable panel and is used to switch the viewing angle switchable panel between a first viewing angle mode and a second viewing angle mode. The driving element is coupled to the display module and is used to provide a first data voltage to at least one of the first units of the display module in the first viewing angle mode, and provide a second data voltage to the at least one of the first units in the second viewing angle mode. The first data voltage and the second data voltage are different.

Based on the above, the electronic device of the disclosure can correspondingly adjust the data voltage provided to the display module according to the viewing angle mode of the viewing angle switchable panel, so as to effectively improve a color shift of the display module in the case where the viewing angle switchable panel operates in a privacy protection mode.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
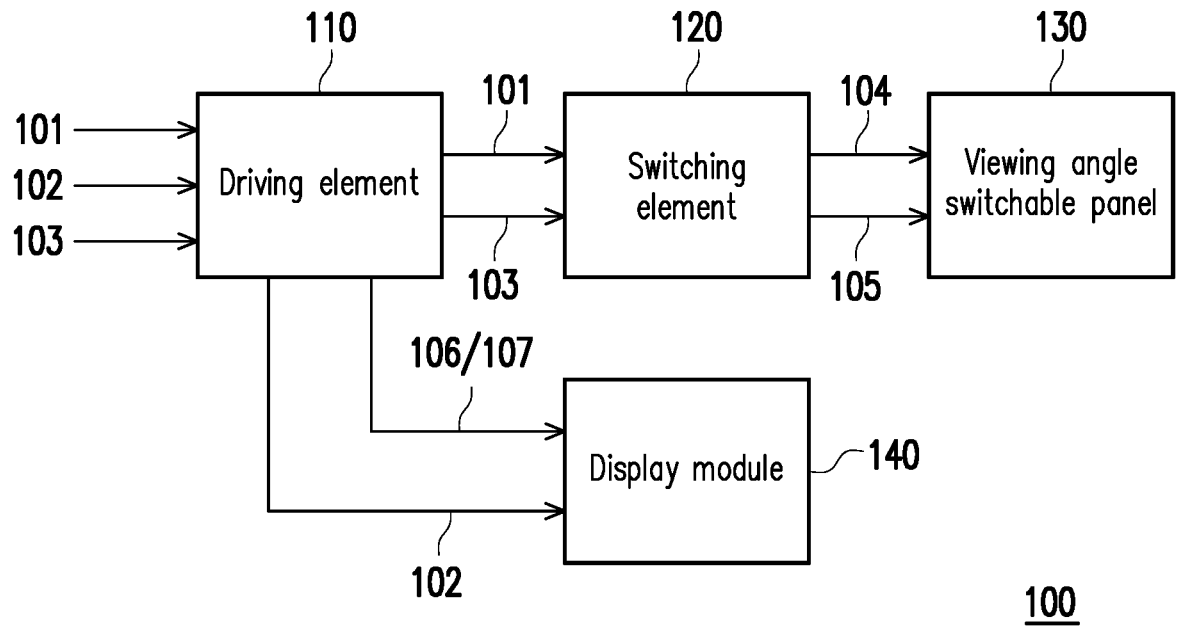
FIG. 1 is a schematic diagram of a circuit of an electronic device according to an embodiment of the disclosure.

Reference will now be made in detail to the exemplary embodiments of the disclosure, examples of which are illustrated in the drawings. Wherever possible, the same reference numerals are used in the drawings and description to refer to the same or similar parts.

Throughout the specification and the appended claims of the disclosure, certain terms are used to refer to specific elements. It should be understood by persons skilled in the art that electronic device manufacturers may refer to the same component by different names. The disclosure does not intend to distinguish between components with the same function but different names. In the following specification and claims, words such as "containing" and "comprising" are open-ended words, so the words should be interpreted as "including but not limited to . . . ".

Directional terms, such as "upper", "lower", "front", "rear", "left", and "right", mentioned in the disclosure are only directions with reference to the drawings. Therefore, the used directional terms are used to illustrate, but not to limit, the disclosure. In the drawings, each drawing illustrates the general characteristics of a method, a structure, and/or a material used in a specific embodiment. However, the drawings should not be construed to define or limit the scope or nature covered by the embodiments. For example, the relative sizes, thicknesses, and positions of various film layers, regions, and/or structures may be reduced or enlarged for clarity.

In some embodiments of the disclosure, terms related to bonding and connection, such as "connection" and "interconnection", unless otherwise defined, may mean that two structures are in direct contact, or may also mean that two structures are not in direct contact, wherein there is another structure disposed between the two structures. Also, the terms related to bonding and connection may also include the case where the two structures are both movable or the two structures are both fixed. Furthermore, the term "coupling" includes any direct or indirect means of electrical connection. In the case of direct electrical connection, endpoints of elements on two circuits are directly connected or connected to each other by a conductor segment, while in the case of indirect electrical connection, there is a switch, a diode, a capacitor, an inductor, a resistor, other suitable elements, or a combination of the above elements between the endpoints of the elements on the two circuits, but not limited thereto.

The terms "about", "equal to", "equivalent" or "same", "substantially", or "roughly" are generally interpreted as within 20% of a given value or range, or interpreted as within 10%, 5%, 3%, 2%, 1%, or 0.5% of the given value or range.

In the disclosure, the measurement manner of thickness, length, and width may adopt an optical microscope (OM), and the thickness or the width may be measured by a cross-sectional image in an electron microscope, but not limited thereto. In addition, there may be a certain error between any two values or directions for comparison. Furthermore, the term "a given range is from a first value to a second value" or "a given range is within a range from a first value to a second value" means that the given range includes the first value, the second value, and other values in between. If a first direction is perpendicular to a second direction, an angle between the first direction and the second direction may be between 80 degrees and 100 degrees; and if the first direction is parallel to the second direction, the angle between the first direction and the second direction may be between 0 degrees and 10 degrees.

Terms such as "first" and "second" used in the specification and the claims are used to modify elements, and the terms do not imply and represent that the component(s) have any previous ordinal numbers, nor do they represent the order of a certain element and another element or the order of a manufacturing method. The use of the ordinal numbers is only used to clearly distinguish between an element with a certain name and another element with the same name. The claims and the specification may not use the same terms, whereby a first member in the specification may be a second member in the claims. It should be noted that in the following embodiments, the technical features of several different embodiments may be replaced, reorganized, and mixed to complete other embodiments without departing from the spirit of the disclosure.

It should be noted that in the following embodiments, the features of several different embodiments may be replaced, recombined, and mixed to complete other embodiments without departing from the spirit of the disclosure. As long as the features of the embodiments do not violate the spirit of the disclosure or conflict with each other, the features may be arbitrarily mixed and matched for use.

Unless otherwise defined, all terms (including technical and scientific terms) used herein have the same meaning as commonly understood by persons skilled in the art to which the disclosure belongs. It can be understood that the terms, such as the terms defined in commonly used dictionaries, should be interpreted as having meanings consistent with the relevant art and the background or the context of the disclosure, and should not be interpreted in an idealized or overly formal manner, unless otherwise defined in the embodiments of the disclosure.

An electronic device of the disclosure may include, for example, a display device, an antenna device, a sensing device, a touch electronic device (touch display), a curved electronic device (curved display), or a non-rectangular electronic device (free shape display), or may be a bendable or flexible splicing electronic device, but not limited thereto. A light emitting unit of the electronic device may include, for example, a light emitting diode (LED), liquid crystal, fluorescence, phosphor, quantum dot (QD), other suitable display media, or a combination of the above, but not limited thereto. The light emitting diode may include, for example, an organic light emitting diode (OLED), an inorganic light emitting diode, a mini LED, a micro LED, a quantum dot light emitting diode (QLED or QDLED), other suitable materials, or any combination of the above, but not limited thereto. The antenna device may be, for example, a liquid crystal antenna, but not limited thereto. It should be noted that the electronic device of the disclosure may be any combination of the above, but not limited thereto. In addition, the shape of the electronic device may be rectangular, circular, polygonal, a shape with curved edges, or other suitable shapes. The electronic device may have a driving system, a control system, a light source system, a shelf system, etc., and other peripheral systems to support the display device or the antenna device.

Throughout the specification and the appended claims of the disclosure, certain terms are used to refer to specific elements. It should be understood by persons skilled in the art that electronic device manufacturers may refer to the same component by different names. The disclosure does not intend to distinguish between components with the same function but different names. In the following specification and claims, words such as "comprising" and "containing" are open-ended words, which should be interpreted as "including but not limited to . . . ".

FIG. 1 is a schematic diagram of a circuit of an electronic device according to an embodiment of the disclosure. Referring to FIG. 1, an electronic device 100 includes a driving element 110, a switching element 120, a viewing angle switchable panel 130, and a display module 140. The driving element 110 is coupled to the switching element 120 and the display module 140. The switching element 120 is coupled to the viewing angle switchable panel 130 and is used to switch the viewing angle switchable panel 130 between a first viewing angle mode and a second viewing angle mode. In the embodiment, the driving element 110 may receive an input voltage 101, a display signal 102, and a control signal 103. The driving element 110 may output the input voltage 101 and the control signal 103 to the switching element 120. The switching element 120 may output an operation signal 104 and a clock signal 105 to the viewing angle switchable panel 130 according to the input voltage 101 and the control signal 103. The driving element 110 may also generate a first data voltage 106 or a second data voltage 107 according to the control signal 103. The first data voltage and the second data voltage are different. In the embodiment, the driving element 110 may output the display signal 102 and the first data voltage 106 or the second data voltage 107 to the display module 140 to drive the display module 140. In some embodiments of the disclosure, the first data voltage may be greater than the second data voltage. In other embodiments of the disclosure, the second data voltage may be greater than the first data voltage.

In the embodiment, the driving element 110 may be, for example, a microcontroller (MCU). In the embodiment, the switching element 120 may be a control circuit of the viewing angle switchable panel 130 and may be used to determine whether the viewing angle switchable panel 130 operates in the first viewing angle mode or the second viewing angle mode according to the control signal 103, so as to output the operation signal 104 and the clock signal 105 to the viewing angle switchable panel 130. In the embodiment, the viewing angle switchable panel 130 may be a privacy protection panel and may be, for example, a liquid crystal panel. The viewing angle switchable panel 130 is integrated (laminated together) with the display module 140. The viewing angle switchable panel 130 may switch to operate in different viewing angle modes according to the change of at least one of the operation signal 104 and the clock signal 105. As such, the viewing angle switchable panel 130 may change an arrangement direction of liquid crystals according to at least one of the operation signal 104 and the clock signal 105 to change a visible range. In the embodiment, a first viewing angle corresponding to the first viewing angle mode is greater than a second viewing angle corresponding to the second viewing angle mode. Specifically, the first viewing angle mode may be, for example, a sharing mode (also referred to as a wide viewing angle mode), and the display module 140 may have the first viewing angle of close to 180 degrees. The second viewing angle mode may be, for example, a privacy protection mode (also referred to as a narrow viewing angle mode), and the display module 140 may have, for example, the second viewing angle of 50 degrees. It should be noted that the viewing angle may refer to, for example, an included angle between a left border and a right border of the visible range.

In the embodiment, the display module 140 may have multiple first units and multiple second units. The first units may have a first color, and the second units may have a second color, wherein the first color and the second color are different. In the embodiment, the first units may be red, green, blue, or other colors, and the disclosure is not limited thereto. The second units may be red, green, blue, or other colors, and the disclosure is not limited thereto. The first units have the same color, and the second units have the same color. The first units and the second units have different colors. In the embodiment, the driving element 110 may provide the first data voltage to at least one of the first units of the display module 140 in the first viewing angle mode, and provide the second data voltage to the at least one of the first units in the second viewing angle mode, wherein the first data voltage and the second data voltage are different. It should be noted that the first units and the second units may refer to, for example, multiple sub-pixels in a panel. In other words, when the viewing angle mode of the viewing angle switchable panel 130 changes, the driving element 110 may correspondingly change the data voltage of at least one of the sub-pixels driving the display module 140.

Figure 2A:
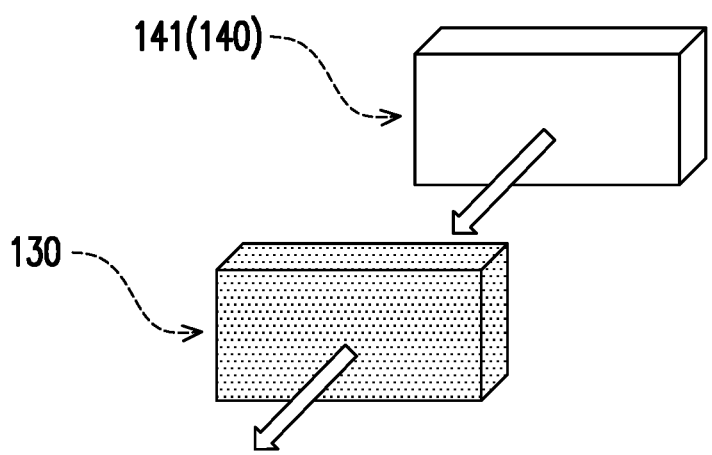
FIG. 2A is a schematic diagram of an arrangement of a display module and a viewing angle switchable panel according to an embodiment of the disclosure.

FIG. 2A is a schematic diagram of an arrangement of a display module and a viewing angle switchable panel according to an embodiment of the disclosure. Referring to FIG. 1 and FIG. 2A, the display module 140 of FIG. 1 may include, for example, a display panel 141 of FIG. 2A. The display panel 141 may include multiple first units and multiple second units, wherein the first units may be multiple first sub-pixels, and the second units may be multiple second sub-pixels. The display panel 141 may be a self-luminous display panel, such as a micro light emitting diode (micro LED) panel, a mini LED panel, or an organic light emitting diode (OLED) panel.

In the embodiment, the viewing angle switchable panel 130 may be disposed before a light emitting surface of the display panel 141, so that the display light emitted by the display panel 141 may pass through the viewing angle switchable panel 130. In this way, when the viewing angle switchable panel 130 operates in the first viewing angle mode and/or the second viewing angle mode, the visible range of the display light emitted by the display panel 141 can be effectively changed. In addition, at least one of the first units of the display panel 141 of the embodiment may be driven by using different data voltages in the first viewing angle mode and the second viewing angle mode, so as to effectively improve a color shift caused by the display light emitted by a display panel 141" after passing through the viewing angle switchable panel 130.

Figure 2B:
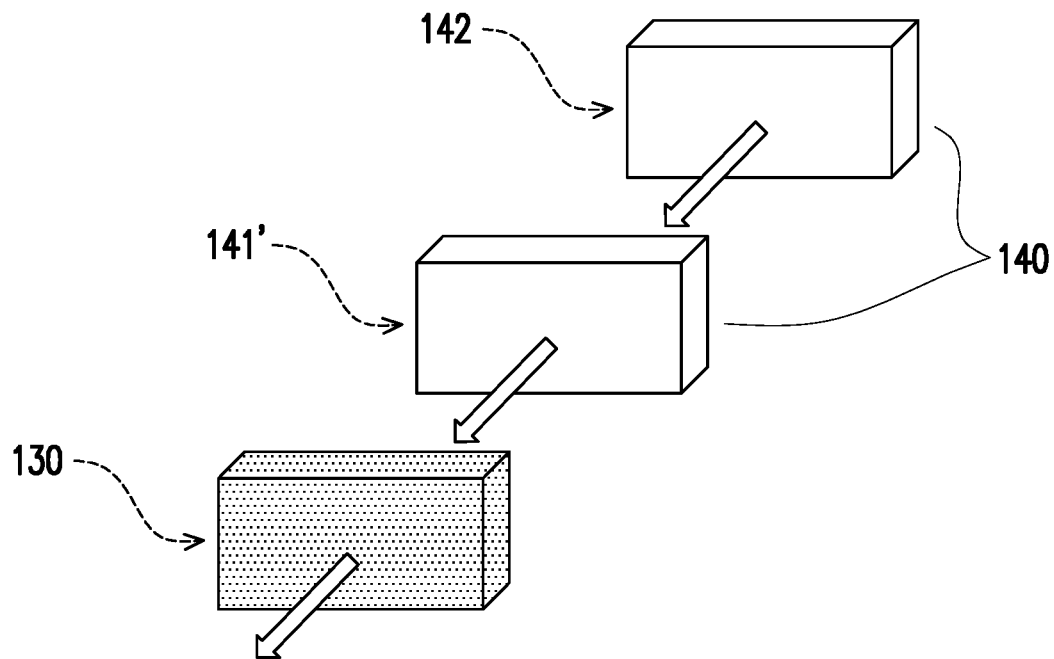
FIG. 2B is a schematic diagram of an arrangement of a display module and a viewing angle switchable panel according to another embodiment of the disclosure.

FIG. 2B is a schematic diagram of an arrangement of a display module and a viewing angle switchable panel according to another embodiment of the disclosure. Referring to FIG. 1 and FIG. 2B, the display module 140 of FIG. 1 may include, for example, a display panel 141' and a light source element 142 of FIG. 2B. The display panel 141' may be, for example, a liquid crystal display (LCD) panel, and the light source element 142 may be, for example, a backlight source of a light emitting diode (LED) providing white light or a backlight source of an RGB light emitting diode (LED) providing a color light source. In the embodiment, the display panel 141' may include multiple first units and multiple second units, wherein the first units may be multiple first sub-pixels, and the second units may be multiple second sub-pixels. Alternatively, the light source element 142 may include multiple first units and multiple second units, and the first units and the second units respectively correspond to multiple sub-pixels of the display panel 141'. In some embodiments of the disclosure, the first units may include multiple first light emitting diodes, the second units may include multiple second light emitting diodes, and the first light emitting diodes and the second light emitting diodes may have different colors. In some embodiments of the disclosure, different first data voltage and second data voltage are provided for the same first unit in different viewing angle modes, so that the same first unit may have different brightness.

In the embodiment, the display panel 141' may be disposed between the viewing angle switchable panel 130 and the light source element 142. The viewing angle switchable panel 130 may be disposed before a light emitting surface of the display panel 141', and the display panel 141' may be disposed before a light emitting surface of the light source element 142, so that the display light emitted by the light source element 142 may pass through the display panel 141' and the viewing angle switchable panel 130. In this way, when the viewing angle switchable panel 130 operates in the first viewing angle mode and/or the second viewing angle mode, the visible range of the display light emitted by the display panel 141' can be effectively changed. In addition, at least one of the first units of the display panel 141' or the light source element 142 of the embodiment may be driven by using different data voltages in the first viewing angle mode and the second viewing angle mode, so as to effectively improve a color shift caused by the display light emitted the display panel 141" after passing through the viewing angle switchable panel 130.

Figure 2C:
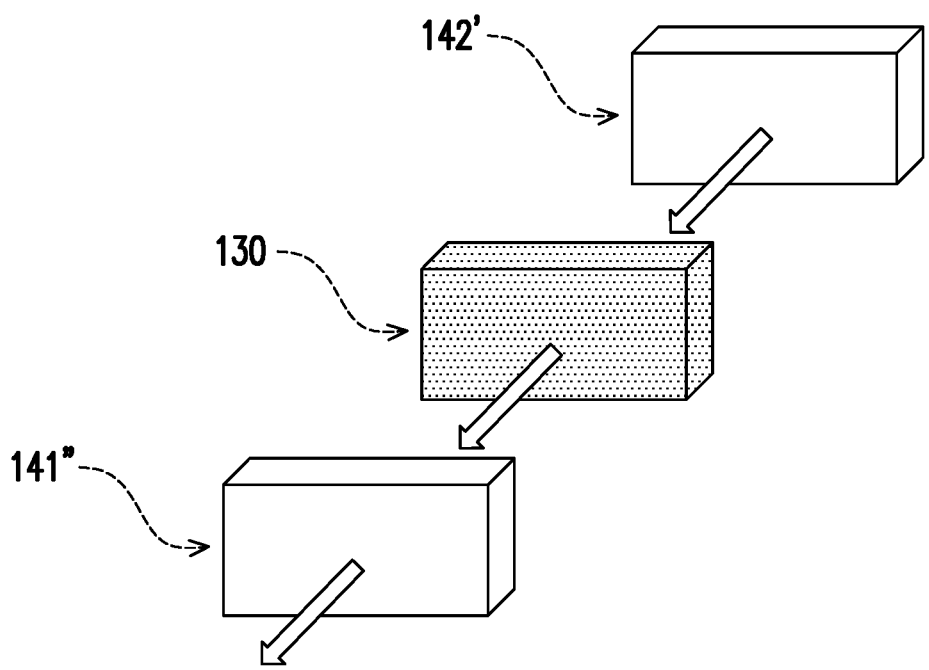
FIG. 2C is a schematic diagram of an arrangement of a display module and a viewing angle switchable panel according to yet another embodiment of the disclosure.

FIG. 2C is a schematic diagram of an arrangement of a display module and a viewing angle switchable panel according to yet another embodiment of the disclosure. Referring to FIG. 1 and FIG. 2C, the display module 140 of FIG. 1 may include, for example, the display panel 141" and a light source element 142' of FIG. 2C. The display panel 141" may be, for example, a liquid crystal display (LCD) panel, and the light source element 142' may be, for example, a backlight source of a light emitting diode (LED) providing white light or a backlight source of an RGB light emitting diode (LED) providing a color light source. In the embodiment, the display panel 141" may include multiple first units and multiple second units, wherein the first units may be multiple first sub-pixels, and the second units may be multiple second sub-pixels. Alternatively, the light source element 142' may include multiple first units and multiple second units, and the first units and the second units respectively correspond to multiple sub-pixels of the display panel 141".

In the embodiment, the viewing angle switchable panel 130 may be disposed between the display panel 141" and the light source element 142'. The display panel 141" may be disposed before a light emitting surface of the viewing angle switchable panel 130, and the viewing angle switchable panel 130 may be disposed before a light emitting surface of the light source element 142', so that the display light emitted by the light source element 142' may pass through the viewing angle switchable panel 130. In this way, when the viewing angle switchable panel 130 operates in the first viewing angle mode and/or the second viewing angle mode, the visible range of the display light emitted by the display panel 141" can be effectively changed. In addition, at least one of the first units of the display panel 141" or the light source element 142' of the embodiment may be driven by using different data voltages in the first viewing angle mode and the second viewing angle mode, so as to effectively improve a color shift caused by the display light emitted by the display panel 141" after passing through the viewing angle switchable panel 130.

Figure 3:
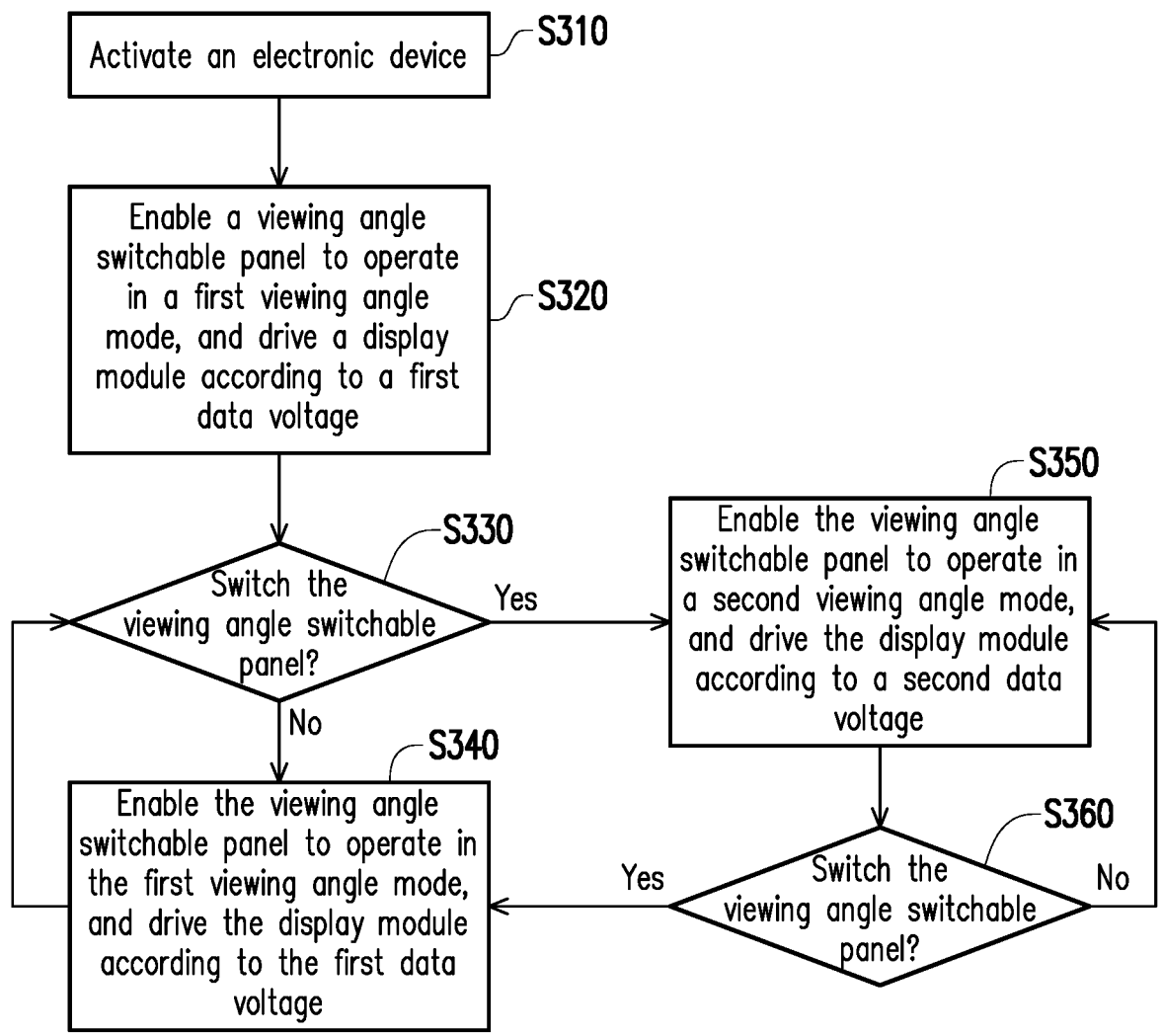
FIG. 3 is a flowchart of an operation of an electronic device according to an embodiment of the disclosure.

FIG. 3 is a flowchart of an operation of an electronic device according to an embodiment of the disclosure. Referring to FIG. 1, FIG. 2A, and FIG. 3, the following embodiment is exemplified with the display module of FIG. 2A, and the display module of FIG. 2B and FIG. 2C is applicable by analogy. In the embodiment, the electronic device 100 may execute Step S310 to Step S360 below. In Step S310, the electronic device 100 is activated. In Step S320, the driving element 110 may enable the viewing angle switchable panel 130 to operate in the first viewing angle mode through the switching element 120, and drive the display module 140 according to the first data voltage. In the embodiment, the viewing angle switchable panel 130 may operate in the first viewing angle mode, such as a sharing display mode (also referred to as the wide viewing angle mode or a normal display mode), and the driving element 110 may drive at least one of the first units in the display module 140 according to the first data voltage. In detail, the driving element 110 may drive the first units of the display panel 141 of the display module 140 according to the first data voltage. The first units of the display panel 141 of the display module 140 may be, for example, sub-pixels that can emit display light.

Figure 4:
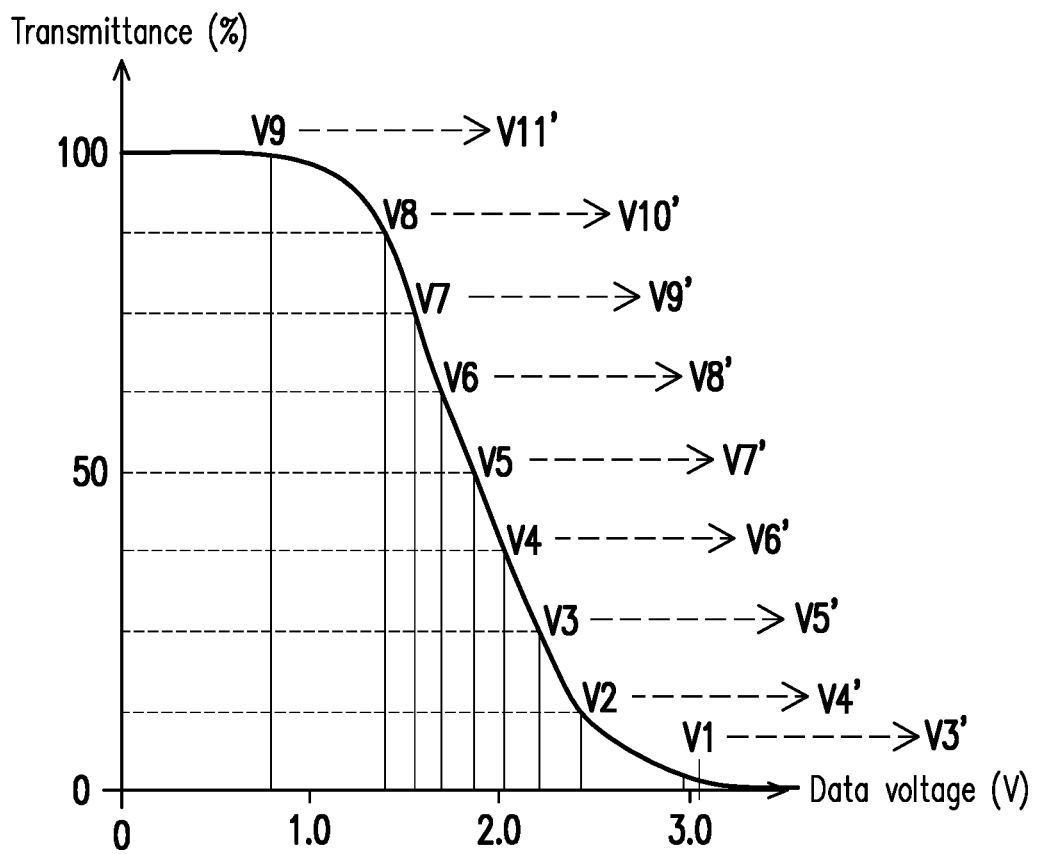
FIG. 4 is a schematic diagram of a relationship between transmittance and data voltage according to an embodiment of the disclosure.

With reference to FIG. 4, FIG. 4 is a schematic diagram of a relationship between transmittance and data voltage according to an embodiment of the disclosure. The first data voltage may be, for example, data voltages V1 to V9 shown in FIG. 4, wherein the data voltages V1 to V9 may respectively correspond to, for example, different transmittance of 0% to 100% of the first units. In the embodiment, taking the display panel 141 of a normal white (NW) type as an example, the higher the data voltage applied to the first units of the display panel 141 of the display module 140, the lower the transmittance of the first units of the display panel 141 of the display module 140. Conversely, the lower the data voltage applied to the first units of the display panel 141 of the display module 140, the higher the transmittance of the first units of the display panel 141 of the display module 140. On the other hand, in another embodiment, although not shown in the drawing, taking the display panel 141 of a normal black (NB) type is as an example, the higher the data voltage applied to the first units of the display panel 141 of the display module 140, the higher the transmittance of the first units of the display panel 141 of the display module 140. Conversely, the lower the data voltage applied to the first units of the display panel 141 of the display module 140, the lower the transmittance of the first units of the display panel 141 of the display module 140.

Referring to FIG. 3, in Step S330, the driving element 110 may judge whether to switch the viewing angle switchable panel 130. If not, Step S340 is executed, so that the viewing angle switchable panel 130 may continue to operate in the first viewing angle mode, and continue to drive the display module 140 according to the first data voltage. If yes, Step S350 is executed. In Step S350, the driving element 110 may enable the viewing angle switchable panel 130 to operate in the second viewing angle mode through the switching element 120, and drive the display module 140 according to the second data voltage.

With reference to FIG. 4, the second data voltage may be, for example, data voltages V3' to V11' shown in FIG. 4. In the embodiment, the driving element 110 may adjust a gamma code for driving the display panel 141, so that the first data voltages V1 to V9 for driving the first units of the display panel 141 of the display module 140 are adjusted to second data voltages V1' to V9', and the second data voltage V10' and the second data voltage V11' corresponding to, for example, the transmittance of 88% and the transmittance of 100% may be added. In addition, although the second data voltage V1' and the second data voltage V2' are not shown in the drawing, the second data voltage V1' and the second data voltage V2' may be analogized to both be the highest data voltages and both correspond to the transmittance of 0%. As such, each of the second data voltages V1' to V9' may be respectively higher than a corresponding one of the first data voltages V1 to V9. For example, the first data voltage V7 may be 1.5 volts (V), and the adjusted first data voltage V7' may be 1.8 volts (V). In this way, for example, originally, the driving element 110 drives the first units of the display panel 141 of the display module 140 by using the first data voltage V7 to implement the transmittance of 75%. After the adjustment of the gamma code, the driving element 110 may automatically switch to driving the first units of the display panel 141 of the display module 140 by using the second data voltage V7' to implement the transmittance of 50%. As such, in the case where the display data for driving the display panel 141 remains unchanged, the display panel 141 may automatically reduce the transmittance of the overall display.

Figure 5:
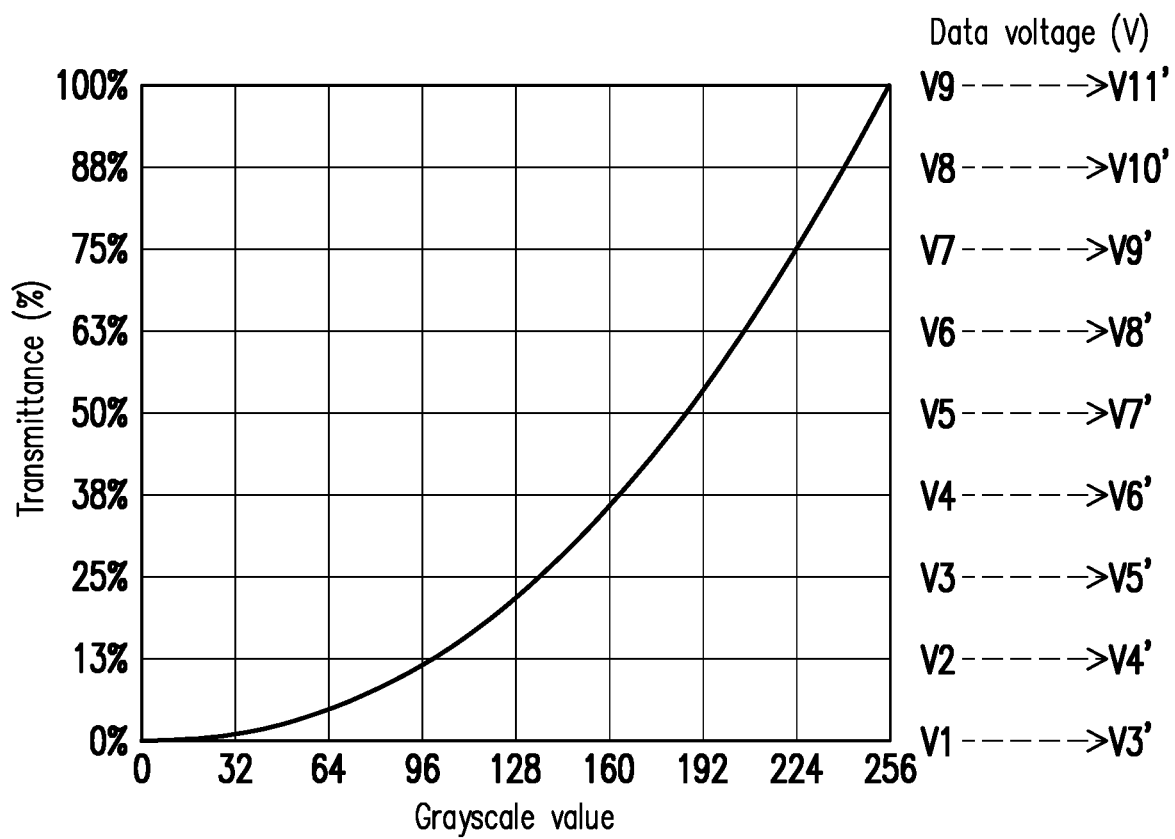
FIG. 5 is a schematic diagram of a gamma curve according to an embodiment of the disclosure.

Also, with reference to FIG. 5, FIG. 5 is a schematic diagram of a gamma curve according to an embodiment of the disclosure. The first data voltages V1 to V9 respectively corresponding to the transmittance of 0%, 13%, 25%, 38%, 50%, 63%, 75%, 88%, and 100% are changed to the second data voltages V1' to V9', and the second data voltage V10' and the second data voltage V11' corresponding to, for example, the transmittance of 88% and the transmittance of 100% may be added. In addition, although the second data voltage V1' and the second data voltage V2' are not shown in the drawing, the second data voltage V1' and the second data voltage V2' may be analogized to both be the highest data voltages and both correspond to the transmittance of 0%. Therefore, for example, the original data voltage V7 driving the first units of the display panel 141 of the display module 140 enables the first units of the display panel 141 of the display module 140 to operate in a state with the transmittance of 75% and to have, for example, a grayscale value of 224. After the adjustment of the gamma code, since the original data voltage V7 driving the first units of the display panel 141 of the display module 140 is adjusted to the data voltage V7', the first units of the display panel 141 of the display module 140 may be operated in a state with the transmittance of 50% and have, for example, a grayscale value of 184. As such, in the case where the display data for driving the display panel 141 remains unchanged, the display panel 141 may automatically reduce the grayscale value of the overall display (that is, achieve the effect of reducing the transmittance).

In other words, by providing different data voltages for the first units, the transmittance (or the grayscale value) of the first units of the display module 140 in the second viewing angle mode is lower than the transmittance (or the grayscale value) in the first viewing angle mode). The driving element 110 may adjust the gamma code for driving the first units of the display panel 141 of the display module 140, and not adjust the gamma code for driving the second units of the display panel 141 of the display module 140. As such, in the first viewing angle mode and the second viewing angle mode, the driving element 110 may provide the same data voltage to the second units of the display panel 141 of the display module 140. The second units of the display panel 141 of the display module 140 may have the same transmittance (or grayscale value) in the first viewing angle mode and the second viewing angle mode. In this way, under different viewing angles, the transmittance is adjusted for the first units, but not for the second units.

Referring to FIG. 3, in Step S360, the driving element 110 may judge whether to switch the viewing angle switchable panel 130. If not, Step S350 is executed, so that the viewing angle switchable panel 130 may continue to operate in the second viewing angle mode, and continue to drive the display module 140 according to the second data voltage. If yes, Step S340 is executed, so that the viewing angle switchable panel 130 operates in the first viewing angle mode, and drives the display module 140 according to the first data voltage. Therefore, the driving element 110 of the embodiment may automatically and correspondingly adjust the transmittance (or the grayscale value) of the first units of the display panel 141 of the display module 140 according to whether the viewing angle switchable panel 130 operates in the first viewing angle mode or the second viewing angle mode.

In an embodiment, the first units of the display panel 141 of the display module 140 are illustrated by taking, for example, blue as an example, but the disclosure is not limited thereto. For example, the first unit is a blue unit, such as a blue sub-pixel in the display panel 141, and the second unit of the display panel 141 of the display module 140 may be, for example, a red sub-pixel or a green sub-pixel. When the viewing angle switchable panel 130 operates in the first viewing angle mode (for example, the wide viewing angle mode), for example, the first data voltage V7 (as shown in FIG. 4) may be provided to the blue unit of the display panel 141, so that the blue unit is operated in a state with normal transmittance (or normal grayscale value). When the viewing angle switchable panel 130 operates in the second viewing angle mode (for example, the narrow viewing angle mode), if the same first data voltage V7 is still provided to the blue unit, the light emission of the blue unit may be affected by the viewing angle switchable panel 130, causing a bluish color shift in the light emission. In some embodiments of the disclosure, in the second viewing angle mode, the second data voltage is provided to the first units, and the second data voltage is greater than the first data voltage. In detail, in the second viewing angle mode, the second data voltage V7' (V5) is provided to the blue unit of the display panel 141. As shown in FIG. 4, the second data voltage V7' (V5) is greater than the first data voltage V7, the first data voltage V7 corresponds to higher transmittance (75%), and the second data voltage V5 corresponds to lower transmittance (50%). In this way, in the second viewing angle mode, the first unit (for example, the blue unit) may be correspondingly operated in a state with lower transmittance (or a lower grayscale value) to reduce the brightness of the blue display light emitted by the display panel 141, so as to effectively reduce or eliminate the blue color shift of the display light. In some embodiments of the disclosure, different first data voltage and second data voltage are provided for the same first unit in different viewing angle modes, so that the same first unit can have different transmittance.

For convenience of description, in the above embodiments, the first unit is taken as an example for illustration. In some embodiments of the disclosure, the data voltage may be adjusted for units with two different colors according to requirements. For example, in addition to adjusting the data voltage of the first unit as described above, a third data voltage may be provided for at least one of the second units of the display module in the first viewing angle mode, and a fourth data voltage may be provided for the same second unit in the second viewing angle mode, wherein the third data voltage and the fourth data voltage are different. Similarly, in some embodiments of the disclosure, different third data voltage and fourth data voltage are provided for the same second unit, so that the same second unit can have different transmittance. In some embodiments of the disclosure, different third data voltage and fourth data voltage are provided for the same second unit, so that the same second unit can have different brightness. Similar to the first unit, data voltages of other units in the display module may also be adjusted according to requirements, which will not be repeated here.

Figure 6:
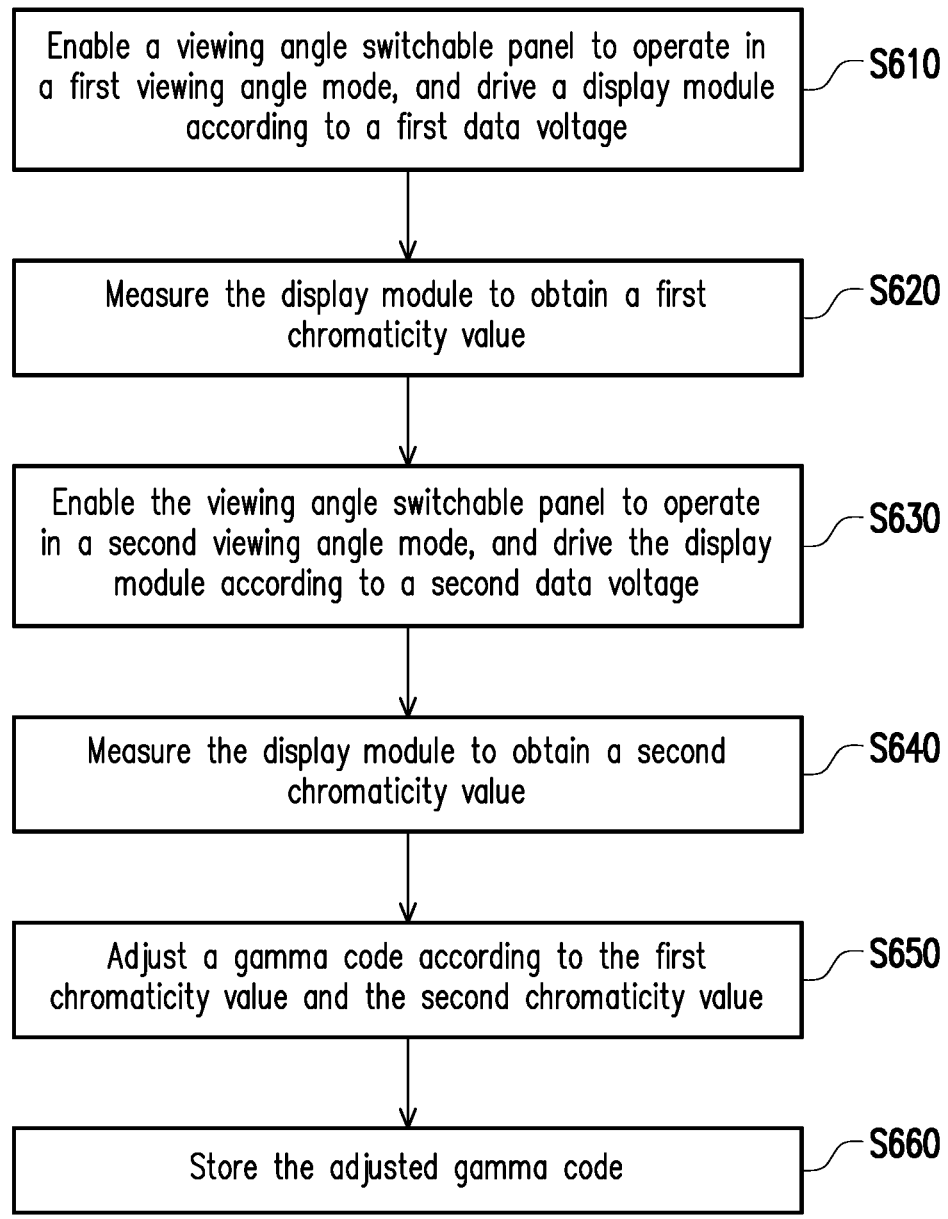
FIG. 6 is a flowchart of adjusting a gamma code according to an embodiment of the disclosure.

FIG. 6 is a flowchart of adjusting a gamma code according to an embodiment of the disclosure. Referring to FIG. 1 and FIG. 6, the electronic device 100 of the embodiment may execute, for example, Steps S610 to S660 below before the equipment leaves the factory to adjust the gamma code. In Step S610, the driving element 110 may first enable the viewing angle switchable panel to operate in the first viewing angle mode, and drive the display module 140 according to the first data voltage. In Step S620, the display module 140 may be measured by a chromaticity measuring device to obtain a first chromaticity value. Next, in Step S630, the driving element 110 may enable the viewing angle switchable panel to operate in the second viewing angle mode, and drive the display module 140 according to the second data voltage. In Step S640, the display module 140 may be measured by the chromaticity measuring device to obtain a second chromaticity value. In Step S650, the gamma code may be adjusted according to the first chromaticity value and the second chromaticity value. As such, the gamma code for driving the first units of the display module 140 may be modified according to, for example, a difference value between the first chromaticity value and the second chromaticity value. In Step S660, the driving element 110 may store the adjusted gamma code. Therefore, during the actual application process of the electronic device 100, the first units of the display module 140 may drive the display module 140 by using different data voltages by the gamma code stored in the driving element 110 in the first viewing angle mode and the second viewing angle mode. In this way, a color shift caused by the display light emitted by the display module 140 after passing through the viewing angle switchable panel 130 due to the change of the visible range (the viewing angle) of the viewing angle switchable panel 130 can be effectively improved.

In addition, it should be noted that any electronic device may judge whether to adopt the technical solutions provided by the disclosure according to whether the electronic device is equipped with a viewing angle switchable panel, and whether a driving element of the electronic device can switch the output of a gamma code or whether a display module can receive different gamma codes after the visible range of the viewing angle switchable panel changes.

In summary, in the electronic device according to some embodiments of the disclosure, the driving element may be used to provide different data voltages for the first units of the display module in different viewing angle modes. In this way, the color shift of the display module caused by different viewing angle modes can be improved. In some embodiments of the disclosure, the electronic device may correspondingly adjust the driving voltage for driving at least one of the color sub-pixels of the display module according to whether the viewing angle switchable panel operates in the sharing mode or the privacy protection mode, so as to effectively improve the color shift caused by the display light emitted by the display module after passing through the viewing angle switchable panel. Therefore, the electronic device of the disclosure can provide a good privacy protection and display quality at the same time.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments can still be modified or some or all of the technical features thereof can be equivalently replaced. However, the modifications or replacements do not cause the essence of the corresponding technical solutions to deviate from the scope of the technical solutions of the embodiments of the disclosure.

What is claimed is:

1. An electronic device, comprising:
   a display module, comprising a display panel, wherein the display panel comprises a plurality of first units and a plurality of second units, the first units have a first color, and the second units have a second color, wherein the first color and the second color are different;
   a viewing angle switchable panel;
   a switching element, coupled to the viewing angle switchable panel and used to switch the viewing angle switchable panel between a first viewing angle mode and a second viewing angle mode, wherein the first viewing angle mode is a wide viewing angle mode, and the second viewing angle mode is a narrow viewing angle mode; and
   a driving element, coupled to the display module, wherein in the first viewing angle mode, the driving element is used to provide a first data voltage to at least one of the first units of the display panel and to provide a first transmittance of the at least one of the first units,
   wherein in the second viewing angle mode, the driving element is used to provide a second data voltage to the at least one of the first units of the display panel and to provide a second transmittance of the at least one of the first units, wherein the first data voltage and the second data voltage are different, and the second transmittance of the at least one of the first units is lower than the first transmittance of the at least one of the first units, and
   wherein the driving element is further used to provide a same data voltage to at least one of the second units in the first viewing angle mode and in the second viewing angle mode,
   wherein in different viewing angle modes, the driving element adjusts a gamma code for driving the at least one of the first units of the display panel,
   wherein respectively in the first viewing angle mode and the second viewing angle mode, the display module is measured by a chromaticity measuring device to obtain a first chromaticity value and a second chromaticity value, and the gamma code for driving the at least one of the first units of the display panel is adjusted according to the first chromaticity value and the second chromaticity value,
   wherein the gamma code for driving the at least one of the first units of the display panel is modified according to a difference value between the first chromaticity value and the second chromaticity value.

2. The electronic device according to claim 1, wherein the first units comprise a plurality of first sub-pixels, and the second units comprise a plurality of second sub-pixels.

3. The electronic device according to claim 1, wherein the display module comprises a light source element, and the viewing angle switchable panel is disposed between the display panel and the light source element.

4. The electronic device according to claim 1, wherein the display module comprises a light source element, and the display panel is disposed between the viewing angle switchable panel and the light source element.

5. The electronic device according to claim 1, wherein the second data voltage is greater than the first data voltage.

6. The electronic device according to claim 1, wherein the first viewing angle mode is a sharing mode, and the second viewing angle mode is a privacy protection mode.

7. The electronic device according to claim 1, wherein the switching element outputs an operation signal and a clock signal to the viewing angle switchable panel to operate the viewing angle switchable panel in the first viewing angle mode or the second viewing angle mode.

8. The electronic device according to claim 1, wherein in different viewing angle modes, the driving element does not adjust a gamma code for driving the second units of the display panel.

9. The electronic device according to claim 1, wherein the at least one of the first units of the display panel has a first grayscale value in the first viewing angle mode, and the at least one of the first units of the display panel has a second grayscale value in the second viewing angle, wherein the second grayscale value is lower than the first grayscale value.

10. The electronic device according to claim 1, wherein the at least one of the first units of the display panel has different brightness in the first viewing angle mode and the second viewing angle mode.

11. The electronic device according to claim 1, wherein the viewing angle switchable panel is a liquid crystal panel.

* * * * *